May 17, 1949. B. J. KRINGS 2,470,624
DYNAMIC BRAKING CONTROL SYSTEM
Filed March 13, 1947
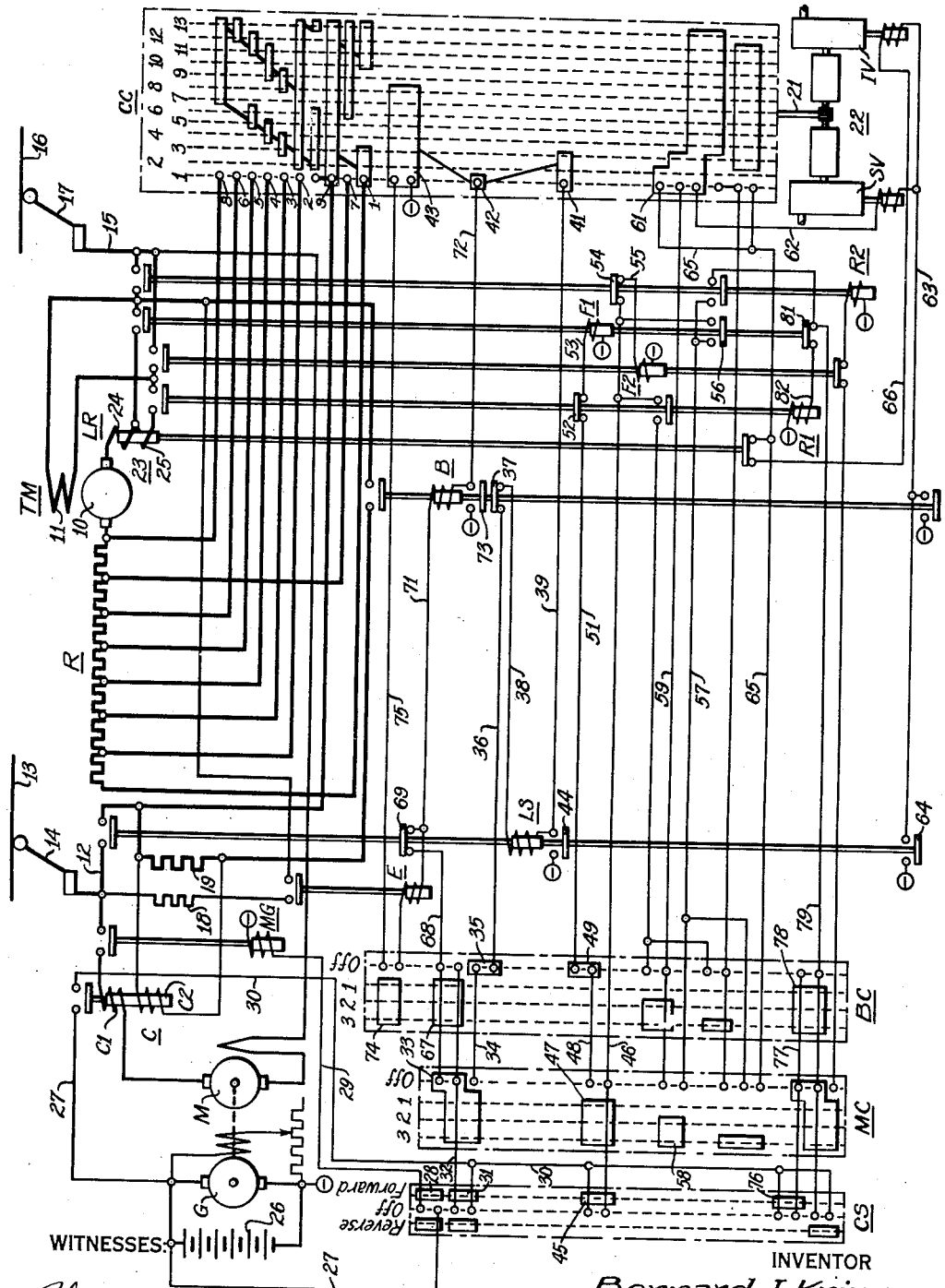
WITNESSES:
Robert C Baird
INVENTOR
Bernard J. Krings.
BY
L. W. Crawford
ATTORNEY Patented May 17, 1949

2,470,624

UNITED STATES PATENT OFFICE 2,470,624

DYNAMIC BRAKING CONTROL SYSTEM

Bernard J. Krings, Pittsburgh, Pa., assignor to Westinghouse Electric Corporation, East Pittsburgh, Pa., a corporation of Pennsylvania Application March 13, 1947, Serial No. 734,333

7 Claims. (Cl. 318—375)

My invention relates, generally, to control systems, and, more particularly, to systems for controlling the operation of electrically propelled vehicles, such as trolley coaches.

On trolley coaches, a power interruption caused by either an overhead insulated section or the de-wirement of a current collector results in the loss of dynamic braking. Coaches having a 600 volt control system automatically lose voltage for operating the braking control apparatus when the 600 volt source is interrupted. Consequently, a loss of dynamic braking occurs.

On coaches having a battery voltage control system, the control circuits are so interlocked that a loss of overhead voltage causes an interruption of the battery voltage on the control system. Therefore, a loss of dynamic braking occurs. Because of the possibility of serious accidents occurring as a result of such a dynamic braking failure, it is desirable to eliminate this hazard.

An object of my invention, generally stated, is to provide a dynamic braking control system which shall be simple and efficient in operation and which may be economically manufactured and installed.

A more specific object of my invention is to provide for retaining the dynamic braking connections for the propelling motor on a vehicle regardless of the trolley voltage.

Other objects of my invention will be explained fully hereinafter or will be apparent to those skilled in the art.

In accordance with one embodiment of my invention, a relay which is responsive to the dynamic braking current functions to cause the dynamic braking connections to be retained, once they have been established, until the end of the braking cycle, thereby preventing the loss of the dynamic brake, event though there is a loss of the trolley voltage.

For a better understanding of the nature and objects of my invention, reference may be had to the following detailed description, taken in conjunction with the accompanying drawing, in which the single figure is a diagrammatic view of a control system embodying the principal features of my invention.

Referring to the drawing, the system shown therein comprises a traction motor TM having an armature winding 10 and a series field winding 11; a line switch LS for connecting the motor TM to a power conductor 12 which may be energized from a trolley conductor 13 through a current collecting device 14; a plurality of reversing switches F1, F2, R1 and R2 for controlling the direction of operation of the motor TM and also connecting the motor to a power conductor 15 which is connected to a trolley conductor 16 through a current collecting device 17; a switch B which cooperates with certain of the reversing switches to establish dynamic braking connections for the motor TM, as described in detail in the copending application of L. G. Riley, Serial No. 508,265, filed October 29, 1943, now Patent 2,456,892, issued December 21, 1948; and a switch E which connects the field winding 11 of the motor TM to the power conductor 12, thereby exciting the motor field during dynamic braking. A resistor 18 is connected in the excitation circuit for the field winding 11, and a resistor 19 is connected in the dynamic braking circuit for the motor TM.

The motor current is controlled during both acceleration and dynamic braking by a resistor R which is shunted from the motor circuit step-by-step by a controller CC which is provided with a plurality of contact members 1 to 8, inclusive, for shunting the resistor R. The controller CC may be of the cam or the drum type, having a shaft 21 which is driven by an air engine 22 of a type well-known in the art.

The air engine 22 is provided with a standard magnet valve SV and an inverted magnet valve IV. The operation of the air engine is automatically controlled during both acceleration and dynamic braking by a current limit relay LR having a series coil 23 which is connected in the motor circuit and is, therefore, responsive to the motor current during both acceleration and dynamic braking. The series coil 23 is divided into two sections 24 and 25. Only the section 24 is utilized during acceleration and both sections are utilized during dynamic braking, thereby changing the calibration of the relay LR during braking.

Manually operable controllers CS and MC are provided for controlling the operation of the reversing switches and the line switch LS and for controlling the supply of control current to the air engine 22. The controller MC controls the operation of the control apparatus during acceleration, and a controller BC controls the operation of the apparatus during dynamic braking. The controllers MC and BC are interlocked in the usual manner to prevent improper operation of the equipment in the event that both of the controllers are operated simultaneously.

A battery 26 is provided for supplying the power for operating the control apparatus. The battery is charged by a generator G which is driven by a motor M. One terminal of the motor M is connected to the power conductor 12 in series-circuit relation with a coil C1 of a relay C by means of a switch MG. The other terminal of the motor is connected directly to the power conductor 15.

As explained hereinbefore, an interruption of the trolley voltage may be caused by a de-wirement of one of the current collectors or by an insulated section in the overhead conductors. In order to prevent an interruption in the trolley voltage from causing a loss of dynamic braking, once the dynamic braking connections have been established, the relay C is provided with a holding coil C2 connected across the resistor 19 which is connected in the dynamic braking circuit. Thus, the coil C2 is energized by the voltage drop across the resistor 19, and the contact members of the relay C are held closed so long as a predetermined amount of dynamic braking current flows through the resistor 19.

Accordingly, the contact members of the relay C remain closed to maintain the supply of power from the battery 26 to the control apparatus, thereby maintaining the dynamic braking connections until the end of the braking cycle. When the vehicle comes to a stop, the contact members of the relay C are opened and it is necessary to re-establish the trolley voltage, thereby energizing the coil C1 before further operation of the vehicle is possible. In this manner dynamic braking is retained, once it has built up, regardless of the trolley voltage.

In order that the functioning of the foregoing apparatus may be more clearly understood, the operation of the system will now be described in more detail. Assuming that it is desired to accelerate the vehicle in a forward direction, the control switch CS is actuated to the "forward" position and the controller MC is actuated to position 1. At this time, the switch MG is closed to energize the coil C1 of the relay C and the motor M, thereby driving the generator G. The energizing circuit for the actuating coil of the switch MG may be traced from the positive terminal of the battery 26 through conductor 27, a contact segment 28 of the switch CS, conductor 29 and the actuating coil of the switch MG to negative.

The energization of the coil C1 causes the closing of the contact members of the relay C, thereby connecting the positive terminal of the battery 26 to the control switch CS through conductor 30. At this time, an energizing circuit is established for the actuating coil of the switch LS which may be traced from the positive conductor 30 through a contact segment 31 on the control switch CS, conductor 32, a segment 33 on the controller MC, conductor 34, a segment 35 on the controller BC, conductor 36, an interlock 37 on the switch B, conductor 38, the actuating coil of the switch LS, conductor 39 and contact members 41, 42 and 43 on the controller CC to negative. A holding circuit is established for the line switch LS through an interlock 44 on the switch LS.

The reversing switches F1 and F2 are also closed at this time. The energizing circuit for the switch F1 extends from the positive conductor 30 through a contact segment 45 on the controller CS, conductor 46, a segment 47 on the controller MC, conductor 48, a segment 49 on the controller BC, conductor 51, an interlock 52 on the switch R1, conductor 53 and the actuating coil of the switch F1 to negative. The energizing circuit for the switch F2 extends from the conductor 46 through an interlock 54 on the switch R2, conductor 55 and the actuating coil of the switch F2 to negative.

The closing of the switches LS, F1 and F2 connects the traction motor TM across the power conductors 12 and 15 in series-circuit relation with the resistor R. The air engine 22 may be operated to shunt the resistor R from the motor circuit step-by-step by actuating the controller MC to positions 2 and 3.

When the controller MC is in position 2, the magnet valve SV is energized through a circuit which extends from the conductor 46 through an interlock 56 on the switch F1, conductor 57, a segment 58 on the controller MC, conductor 59, a segment 61 on the controller CC, conductor 62, the coil of the magnet valve SV, conductor 63 and an interlock 64 on the switch LS to negative. The magnet valve IV is also energized at this time through a circuit which extends from the conductor 59 through the segment 61 on the controller CC, conductor 65, the contact members of the relay LR, conductor 66, the actuating coil of the magnet valve IV, conductor 63 and the interlock 64 to negative.

As explained hereinbefore, the operation of the air engine 22 is under the control of the limit relay LR. Thus, when the motor current exceeds a predetermined amount, the contact members of the relay LR are opened to de-energize the magnet valve IV, thereby stopping the progression of the controller CC. The operator of the vehicle may also stop the progression of the controller CC by holding the controller MC in position 2, thereby stopping the controller CC at a certain point in its travel. The operation of the controller CC may be resumed by actuating the controller MC to position 3.

If it is desired to decelerate the vehicle, the controller MC is actuated to the "off" position, and the controller BC is actuated to one of the braking positions. When the controller MC is returned to the "off" position, the switches LS and F1 are opened to disconnect the motor from the power circuit. Also, the magnet valves of the air engine 22 are de-energized, thereby causing the controller CC to be returned to position 1.

When the controller BC is actuated to position 1, the switches B, E and R1 are closed to establish a dynamic braking circuit for the motor TM. The energizing circuit for the switch B may be traced from positive through the segment 31 on the switch CS, conductor 32, a segment 67 on the controller BC, conductor 68, an interlock 69 on the switch LS, conductor 71, the actuating coil of the switch B, conductor 72 and contact members 42 and 43 on the controller CC to negative. A holding circuit for the switch B is established through an interlock 73 on the switch B.

The energizing circuit for the switch E extends from the conductor 71 through the coil of the switch E, a contact segment 74 on the controller BC, conductor 75 and the segment 43 on the controller CC to negative. The energizing circuit for the switch R1 extends from the positive conductor 30 through a segment 76 on the switch CS, conductor 77, a segment 78 on the controller BC, conductor 79, an interlock 81 on the switch F1, conductor 82 and the actuating coil of the switch R1 to negative.

As shown, the closing of the switches B and R establishes a dynamic braking circuit for the motor TM through the resistors R and 19. This dynamic braking circuit includes the series field winding 11 and both sections of the series coil 23 of the relay LR. The field winding 11 is also connected across the power conductors 12 and 15 through the switches E and F2, thereby separately exciting the field winding 11 and ensuring a prompt building up of the dynamic braking effect.

The controller CC is operated in a manner similar to that during acceleration to shunt the resistor R from the motor circuit step-by-step during dynamic braking. The operation of the controller CC is under the control of the limit relay LR which functions to prevent the motor current from increasing beyond the setting of the relay.

As explained hereinbefore, the contact members of the relay C are normally closed by the energization of the coil C1 which is connected to the power conductor 12 by the switch MG. In case of a trolley voltage interruption, the coil C1 is de-energized, and the contact members of the relay C will open unless the holding coil C2 holds the relay closed.

Whenever the voltage interruption occurs after dynamic braking has been applied and the braking current has built up, the coil C2 will be energized by the voltage drop across the braking resistor 19. This will hold the contact members of the relay C closed until the braking cycle is completed and the vehicle brought to a stop. The contact members of the relay C are then opened, thereby disconnecting the battery 26 from the control apparatus and making it necessary to re-establish trolley voltage before further operation of the vehicle is possible.

If the voltage interruption occurs before the dynamic braking has been applied, the coil C2 will not be energized, and the contact members of the relay C will open to disconnect the control apparatus from the battery. Consequently, no dynamic braking will be available. However, this is desirable since without trolley voltage for separately exciting the motor field through the switches E and F2, the motor will not build up as a generator during dynamic braking, until so much of the main accelerating and braking resistance is shunted by the operation of the controller CC that an objectionable overshooting of the braking current will occur.

From the foregoing description, it is apparent that I have provided a control system which prevents the loss of dynamic braking as a result of an interruption in the trolley voltage of an electrically propelled vehicle, thereby increasing the safety of such vehicles, particularly trolley coaches which may be subjected to frequent interruption in the trolley voltage.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a control system, in combination, a motor, power conductors for the motor, electro-magnetic switching means for establishing dynamic braking circuit connections for the motor, a controller for controlling the operation of said switching means, a source of power for energizing said controller, and relay means responsive to the dynamic braking current and the voltage of said power conductors for maintaining the energizing circuit for said controller during dynamic braking.

2. In a control system, in combination, a motor, power conductors for the motor, switching means for establishing dynamic braking circuit connections for the motor, said switching means having electrically energized actuating means, a source of power for energizing the actuating means of said switching means, and relay means responsive to the dynamic braking current and the voltage of said power conductors for maintaining the energizing circuit for said actuating means during dynamic braking.

3. In a control system, in combination, a motor, power conductors for the motor, switching means for establishing dynamic braking circuit connections for the motor, said switching means having electrically energized actuating means, a controller for controlling the operation of said actuating means, a source of power for energizing said controller, and relay means responsive to the dynamic braking current and the voltage of said power conductors for maintaining the energizing circuit for said controller during dynamic braking.

4. In a control system, in combination, a motor, power conductors for the motor, switching means for establishing dynamic braking circuit connections for the motor, said switching means having electrically energized actuating means, a source of power for energizing the actuating means of said switching means, a resistor connected in the dynamic braking circuit, and a relay having an actuating coil connected across said power conductors and a holding coil connected across said resistor, said relay having contact members disposed to maintain the energizing circuit for said actuating means during dynamic braking.

5. In a control system, in combination, a motor, power conductors for the motor, switching means for establishing dynamic braking circuit connections for the motor, said switching means having electrically energized actuating means, a controller for controlling the operation of said actuating means, a source of power for energizing said controller, a resistor connected in the dynamic braking circuit, and a relay having an actuating coil connected across said power conductors and a holding coil connected across said resistor, said relay having contact members disposed to maintain the energizing circuit for said controller during dynamic braking.

6. In a control system, in combination, a motor, power conductors for the motor, electro-magnetic switching means for establishing dynamic braking circuit connections for the motor, a controller for controlling the operation of said switching means, a source of power for energizing said controller, and a relay having an actuating coil energized from said power conductors and a holding coil responsive to the dynamic braking current, said relay having contact members disposed to maintain the energizing circuit for said controller during dynamic braking.

7. In a control system, in combination, a motor, power conductors for the motor, electro-magnetic switching means for establishing dynamic braking circuit connections for the motor, a controller for controlling the operation of said switching means, a source of power for energizing said controller, a resistor connected in the dynamic braking circuit, and a relay having an actuating coil energized from said power conductors and a holding coil connected across said resistor, said relay having contact members disposed to maintain the energizing circuit for said controller during dynamic braking.

BERNARD J. KRINGS.

REFERENCES CITED

The following references are of record in the file of this patent:

UNITED STATES PATENTS

| Number | Name | Date |
|---|---|---|
| 1,961,822 | Freese | June 5, 1934 |
| 2,008,524 | Tritle | July 16, 1935 |
| 2,400,998 | Krapf | May 28, 1946 |

FOREIGN PATENTS

| Number | Country | Date |
|---|---|---|
| 300,326 | Great Britain | Nov. 15, 1928 |